United States Patent [19]
Ljudmirsky et al.
[11] 3,852,815
[45] Dec. 3, 1974

[54] METHOD OF CHECKING THE POSITION OF A MAGNETIC HEAD RELATIVE TO A MAGNETIC RECORDING MEDIUM AND A TEST MAGNET RECORDING MEDIUM FOR EFFECTING SAID METHOD

[76] Inventors: Mark Lipovich Ljudmirsky, Bulvar Druzhby narodov, 14, kv. 4; Georgy Mironovich Forshtator, ulitsa kropivnitskogo, 14, kv. 4; Yakov Solomonovich Shkurovich, ulitsa Cheljuskintsev, 8, kv. 24, all of Kiev, U.S.S.R.

[22] Filed: Apr. 11, 1973

[21] Appl. No.: 350,023

[52] U.S. Cl. .......................... 360/75, 360/6, 360/31
[51] Int. Cl. ......................... G11b 5/46, G11b 27/34
[58] Field of Search ............ 179/100.2 B, 100.2 A, 179/100.2 R, 100.2 K; 340/174.1 B; 360/75, 31, 6

[56] References Cited

UNITED STATES PATENTS 3,560,931 2/1971 Neville ........................ 179/100.2 K

FOREIGN PATENTS OR APPLICATIONS 1,120,731 9/1958 Germany ..................... 179/100.2 B

OTHER PUBLICATIONS

IBM Technical Disclosure Bulletin, Skew Measurement on Incremental Tape Drives, Vol. 13, No. 8, January 1971, Page 2,379.

*Primary Examiner*—Alfred H. Eddleman
*Attorney, Agent, or Firm*—Holman & Stern

[57] ABSTRACT

A method of checking the position of a magnetic head relative to a magnetic recording medium, wherein two sections of a test signal pattern with mutually displaced recording tracks are recorded on the magnetic recording medium and the correct position of the magnetic head is found by the presence of an output only from that section on which the recording track is located at a minimum allowable distance from the edge of the magnetic recording medium. A test magnetic recording medium exists with magnetic traces corresponding to the test signal pattern, which effects the method.

2 Claims, 4 Drawing Figures

METHOD OF CHECKING THE POSITION OF A MAGNETIC HEAD RELATIVE TO A MAGNETIC RECORDING MEDIUM AND A TEST MAGNET RECORDING MEDIUM FOR EFFECTING SAID METHOD

BACKGROUND OF THE INVENTION

The invention relates to methods of checking the parameters of magnetic signal recording equipment and to means for effecting said methods and more particularly, it relates to a method of checking the position of a magnetic head relative to a magnetic recording medium, as well as to a test magnetic recording medium for effecting the method.

A method of checking the position of a magnetic head relative to a magnetic recording medium, is known in the art wherein two sections of a test signal pattern with mutually displaced recording tracks are recorded on the magnetic recording medium and then the output is found which corresponds to the required position of the magnetic head while the test signal pattern is reproduced.

In accordance with the prior art method, two sections of a test signal pattern formed by the signals of the same frequency and amplitude are recorded on a magnetic recording medium, the recording tracks of the section being mutually displaced and located symmetrically with respect to the middle of the reproduction track of the magnetic head.

There also exist test magnetic recording media for effecting the above method of checking the position of a magnetic head, comprising two sections with mutually displaced recording tracks and with magnetic traces corresponding to sections of a test signal pattern with recorded signals of the same frequency and amplitude.

A disadvantage of the prior art method of checking the position of a magnetic head relative to a magnetic recording medium resides in the fact that the checking accuracy provided by the use of the known magnetic recording medium depends on the accuracy with which the output of the magnetic head is measured.

Another disadvantage of the prior art method is due to the fact that when both sections of the test signal pattern are recorded, the signal amplitude must be maintained strictly constant, as the difference in the amplitude of the recorded signals will cause variation of the output from different sections of the signal pattern even if the magnetic head is positioned correctly.

Still another disadvantage of the prior art method lies in the impossibility to find the direction in which the magnetic head is displaced when it is not positioned correctly.

SUMMARY OF THE INVENTION

It is an object of the present invention, therefore, to provide a method of checking the position of a magnetic head relative to a magnetic recording medium, ensuring a high accuracy in determining, by means of a test magnetic recording medium, the output of the magnetic head.

Another object of the invention is to provide a method whereby it will be possible to determine the direction in which the magnetic head is displaced when improperly positioned.

With these and other objects in view, the essence of the present invention resides the provision of in the method of checking the position of a magnetic head relative to a magnetic recording medium, wherein two sections of a test signal pattern with mutually displaced recording tracks are recorded on the magnetic recording medium and then an output is found corresponding to the required position of the magnetic head while the test signal pattern is reproduced. According to the invention, the sections of the test signal pattern are arranged on the recording medium so that the edge of the recording track of one of the sections is located at a minimum allowable distance from the edge of the recording medium, the edge of the recording track of the other section is located at a maximum allowable distance from the same edge of the recording medium, and the output of the magnetic head is measured while reproducing both sections of the test signal pattern, the required position of the magnetic head being indicated by the fact that the magnetic head produces an output only from that section of the test signal pattern on which the edge of the recording track is displaced by a minimum allowable distance from the edge of the recording medium.

It is expedient that the test magnetic recording medium for checking the position of a magnetic head relative thereto comprise, according to the invention, two sections with magnetic traces corresponding to sections of a test signal pattern with mutually displaced tracks of each section so that the edge of the recording track of one of the sections is located at a minimum allowable distance from the edge of the recording medium and the edge of the recording track of the other section is located at a maximum allowable distance from the same edge of the recording medium.

The method of checking the position of a magnetic head relative to a magnetic recording medium and the test magnetic recording medium effecting this method are advantageous in that they enhance the accuracy of, speed up and simplify the checking procedure and make it possible to find the direction in which the magnetic head being checked is displaced.

BRIEF DESCRIPTION OF THE DRAWINGS

Other objects, advantages and features of the invention will become evident from the following description in which the preferred embodiment is set forth in detail in conjunction with the accompanying drawings, wherein.

Figure 3:
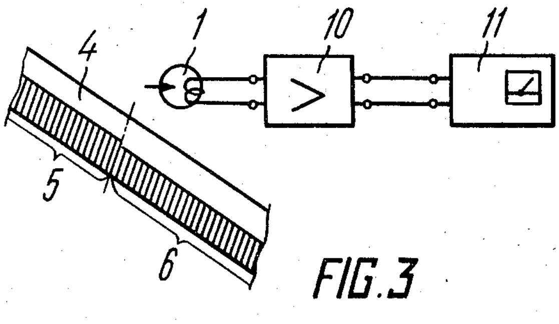
Figure 2:
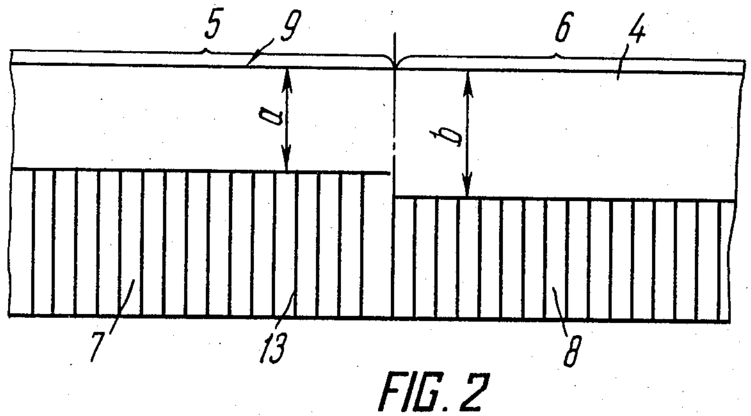
Figure 4:
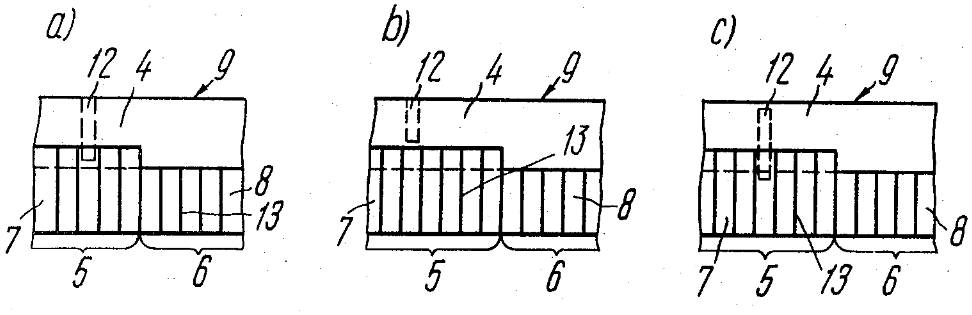

a. the magnetic head being checked is positioned correctly;

b. the magnetic head is positioned too high;

c. the magnetic head is positioned too low;

FIG. 2 shows the test magnetic recording medium for checking the position of a magnetic head, according to the invention;

FIG. 3 is a block diagram of measuring the output of the magnetic head being checked, according to the invention; and FIG. 4 is a projection of the operating gap of the magnetic head being checked on the recording tracks of the test signal pattern sections, according to the invention, when:

a. the magnetic head being checked is positioned correctly;

b. the magnetic head is positioned too high;

c. the magnetic head is positioned too low.

DETAILED DESCRIPTION OF THE PREFERRED EMBODIMENT

Consider now the method of checking the position of a magnetic head and the test magnetic recording medium for effecting this method.

Figure 1:
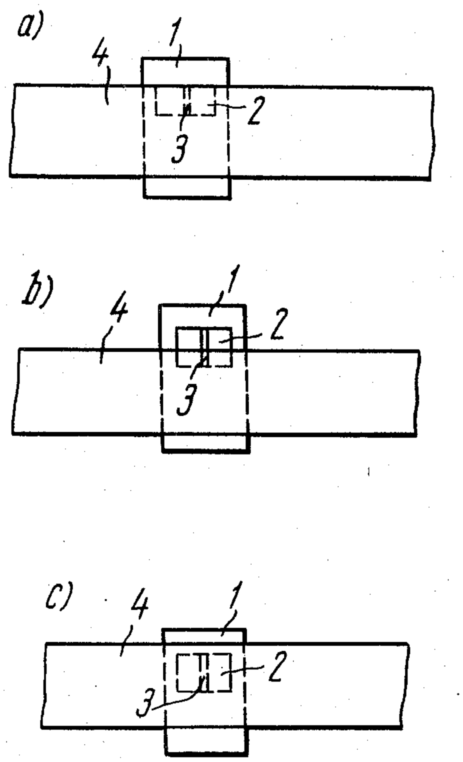
FIG. 1 shows the position of a magnetic head relative to a magnetic recording medium, according to the invention, when.

The relative position of a magnetic head being checked and a test magnetic recording medium is shown in FIG. 1 *a*, *b*, *c*.

FIG. 1*a* shows the correct position of a magnetic head 1 being checked, with a core 2 and an operating gap 3 relative to a test magnetic recording medium 4.

FIG. 1*b* shows the magnetic head 1 being positioned too high relative to the magnetic recording medium 4, and FIG. 1*c* shows the same magnetic head 1 being positioned too low with respect to the recording medium 4.

Used as the magnetic recording medium 4 (FIG. 2) is a magnetic tape, recorded whereon are sections 5 and 6 of a test signal pattern, with mutually displaced recording tracks 7 and 8, the section 5 of the test signal pattern being recorded so that the recording track 7 will be at a minimum allowable distance *a* from an edge 9 of the magnetic tape, and the section 6 of the test signal pattern being recorded so that the recording track 8 be at a maximum allowable distance *b* from the edge 9 of the magnetic tape. These sections 5 and 6 of the test signal pattern are recorded by separate magnetic heads. The location of the recording tracks 7 and 8 on both sections 5 and 6 of the test signal pattern can be checked by measuring under a microscope their distance from the edge 9 of the magnetic tape after the latter is developed in a gasoline suspension of carbonyl iron.

Subsequently, the sections 5 and 6 of the test signal pattern recorded on the magnetic recording medium 4 are reproduced by means of the magnetic head 1 whose position is to be checked and whose output is determined by amplifying its output voltage by means of an amplifier 10 and measuring the value of this voltage by means of a voltmeter 11.

FIG. 4*a*, *b*, *c*, shows a projection 12 of the working gap 3 (FIG. 1) of the magnetic head 1 being checked on the tracks 7 and 8 (FIG. 4) on the sections 5 and 6 of the test signal pattern at different positions of the magnetic tape relative to the magnetic head 1. (FIG. 1). Practically, the projection 21 (FIG. 4) of the operating gap may have three positions: the projection may be superimposed, while moving relative to the magnetic tape, on only one recording track 7 of the sections (FIG. 4*a*); it may be superimposed on neither of the tracks 7 and 8 of the sections (FIG. 4*b*); and it may be superimposed on both recording tracks 7 and 8 of the sections 5 and 6 of the test signal pattern (FIG. 4*c*). If the magnetic head is positioned correctly, it produces an output only when the section 5 is reproduced on which the edge of the recording track 7 is located at the minimum allowable distance *a* (FIG. 2) from the edge 9 of the magnetic tape.

If the magnetic head is positioned too high (FIG. 4*b*), there will be no output from the magnetic head when both sections 5 and 6 of the test signal pattern are reproduced, as the operating gap does not embrace the recording track on either of the sections.

If the magnetic head is positioned too low (FIG. 4*c*), it will produce an output when both sections 5 and 6 of the test signal pattern are reproduced, as in this case the operating gap of the magnetic head being checked embraces the recording tracks of both sections.

A special test magnetic recording medium is manufactured for embodying and effecting the method of checking the position of a magnetic head relative to a magnetic recording medium. The test magnetic recording medium for checking the position of a magnetic head has sections 5 and 6 (FIG. 2) which carry magnetic traces 13 corresponding to sections of a test signal pattern with mutually displaced recording tracks 7 and 8 on each section. The edge of the recording track 7 on the section 5 is at the minimum allowable distance *a* from the edge 9 of the magnetic tape, while the edge of the recording track 8 on the section 6 is at the maximum allowable distance *b* from the same edge 9. The magnetic recording medium 4, aside from being a magnetic tape, may also be a disk, a cup, or a drum, and is prepared specially to suit specific needs of manufacturers of magnetic recording equipment.

The herein disclosed method of checking the position of a magnetic head relative to a magnetic recording medium and the test magnetic recording medium for effecting same may be used in the manufacture and testing of magnetic recording equipment.

The application of the proposed method for checking the position of a magnetic head in conjunction with a test magnetic recording medium for effecting same enables the position of a magnetic head to be checked more accurately, quickly and in a simpler way.

The invention is also advantageous in that it simplifies the procedure for adjusting the position of a magnetic head, as the direction in which the magnetic head is displaced is known and in that the position of the magnetic head can be checked and adjusted to an accuracy of 0.05 mm.

What is claimed is:

1. A method of checking the position of a magnetic head relative to a magnetic recording medium, said method comprising the steps of:

recording a test signal pattern having two sections with mutually displaced recording tracks on the magnetic recording medium, said tracks being disposed on the magnetic recording medium so that the bottom edge of the recording track of one of the two sections is aligned with the bottom edge of the recording medium and so that the top edge thereof is positioned at a minimum allowable distance *a* from the top edge of the recording medium, the bottom edge of the recording track of the other section being also aligned with the bottom edge of the magnetic recording medium and the top edge thereof being positioned at a maximum allowable distance *b* from the top edge of the magnetic recording medium;

reproducing successively both sections of the test signal pattern so as to determine the output of the magnetic head; and producing an output only from the section of the test signal pattern whereon the top edge of the recording track is positioned at the minimum allowable distance from the top edge of the magnetic recording medium in order to indicate that the magnetic head is in the required position.

2. A test magnetic recording medium for checking the position of a magnetic head relative thereto, said recording medium comprising:

two sections being disposed one after the other in the direction of movement of said magnetic recording medium;

a test signal pattern having two mutually displaced signal recording tracks, one of said recording tracks being disposed on one of said two sections so that its bottom edge is aligned with the bottom edge of said magnetic recording medium and so that its top edge is positioned at a minimum allowable distance *a* from the top edge of said magnetic recording medium, the other said recording track of said two sections being disposed so that its bottom edge is also aligned with the bottom edge of said magnetic recording medium and so that its top edge is positioned at a maximum allowable distance *b* from the top edge of said magnetic recording medium;

magnetic traces carried by both said two sections and corresponding to signals of said test signal pattern;

first magnetic traces on one of said two sections, corresponding to the signals of that recording track whose top edge is positioned relative to the top edge of said magnetic recording medium at the minimum allowable distance; and second magnetic traces on the other said two sections, corresponding to the signals of that recording track whose top edge is positioned relative to the top edge of said magnetic recording medium at the maximum allowable distance.

* * * * *